United States Patent [19]

Tanaka et al.

[11] Patent Number: 5,245,887
[45] Date of Patent: Sep. 21, 1993

[54] CONTROL CABLE

[75] Inventors: Masaki Tanaka, Amagasaki; Takashi Yanagita, Nishinomiya; Yasuo Seki, Hyogo; Katsuyuki Sohma, Settsu, all of Japan

[73] Assignee: Nippon Cable System Inc., Takarazuka, Japan

[21] Appl. No.: 953,324

[22] Filed: Sep. 29, 1992

Related U.S. Application Data

[63] Continuation of Ser. No. 573,964, Aug. 28, 1990, abandoned.

[30] Foreign Application Priority Data

Aug. 30, 1989 [JP] Japan .............................. 1-101496[U]
Aug. 30, 1989 [JP] Japan .............................. 1-101497[U]
Aug. 30, 1989 [JP] Japan .............................. 1-101498[U]

[51] Int. Cl.⁵ .............................................. F16C 1/10
[52] U.S. Cl. .................. 74/502.5; 74/500.5; 74/501.5 R
[58] Field of Search ............... 74/501.5 R, 502, 502.4, 74/502.5, 502.6

[56] References Cited

U.S. PATENT DOCUMENTS

| | | | |
|---|---|---|---|
| 3,015,969 | 1/1962 | Bratz | 74/502.5 |
| 3,764,779 | 10/1973 | Kadoya et al. | 74/502.5 X |
| 3,812,738 | 5/1974 | Courtot | 74/502.5 |
| 4,112,708 | 9/1978 | Fukuda | 74/502.5 X |
| 4,300,408 | 11/1981 | Yoshifuji | 74/502.5 |
| 4,378,712 | 4/1983 | Yoshifuji | 74/502.5 |

FOREIGN PATENT DOCUMENTS

| | | | |
|---|---|---|---|
| 3625032 | 1/1987 | Fed. Rep. of Germany | 74/502.5 |
| 56-38802 | 9/1981 | Japan . | |
| 0113908 | 5/1987 | Japan | 74/502.5 |

OTHER PUBLICATIONS

Table 1-68 Alloys of Low Melting Point, p. 128 of Handbook of tables for Applied Engineering Science, CRC Press, 2nd Ed. 1976.

*Primary Examiner*—Vinh T. Luong
*Attorney, Agent, or Firm*—Nikaido, Marmelstein, Murray & Oram

[57] ABSTRACT

A control cable having an inner cable, a conduit for slidably guiding the inner cable, a tubular liner in the conduit and an interposition. The conduit has an outer spring coated with a synthetic resin. The outer spring is made by spirally winding a steel wire around the liner with remaining a clearance between an inner surface of the outer spring and an outer surface of the liner. The interposition is set in the clearance in order to keep a suitable clearance and to provide a suitable resistance for a relative motion between the liner and the outer spring so that thermal expansion and contraction of the liner is not hindered and the liner cannot easily slip out of the outer spring.

19 Claims, 16 Drawing Sheets

1000mm

EXAMPLE 3

COMPARATIVE EXAMPLE 1

COMPARATIVE EXAMPLE 3

CONTROL CABLE

This application is a continuation of application Ser. No. 573,964 filed Aug. 28, 1990 abandoned.

BACKGROUND OF THE INVENTION

The present invention relates to a control cable, and more particularly, to a control cable in which a liner is to be prevented from shrinking, and operating feeling is good, and besides, the liner is not easily slipped out of an outer spring.

A control cable comprises a conduit and an inner core or inner cable, and is a means for remotely controlling an object to be controlled by pulling, by pushing and pulling or by rotating the inner cable.

The above-mentioned conduit generally comprises what is called an armour or outer spring and an outer coat. The outer spring is made by roll-forming a steel wire to a flat strip and then by winding in abutting convolutions to form a coiled spring. Another type of conduit comprises plural steel wires which are laid side by side and wound helically to form a tubular member. The outer coat is a layer of plastic materials which covers and protects the outside surface of the conduit.

The inner cable which is inserted into the above-mentioned conduit comprises a stranded wires obtained by twisting plural wires or strands which are mutually twisted.

In such a control cable, the inside surface of the above-mentioned outer spring is rubbed with the inner cable. Therefore, the operating efficiency and the durability are much influenced by coefficient of friction and degree of abrasion between the outer spring and the inner cable. Therefore, in some cases, as shown in FIG. 16, a tubular liner 3 is set at the inside surface of the outer spring 4 in order to reduce the friction and the abrasion. The tubular liner is generally made of plastics of which coefficient of friction is low and abrasion resistance is superior. The tubular liner can be closely set in the outer spring by winding a flat steel strip around the outside surface of the liner so that the liner is wrapped in the outer spring, or by inserting the liner into the conduit after the outer spring is formed in a coiled-shape.

By the way, recently temperature in an engine room or engine compartment of an automobile and so on has become much higher than the temperature heretofore. For example, it becomes 150° C. under high temperature condition, and in a cold district, it might become −40° C. Under the condition that environment temperature is so severe, troubles come out as mentioned hereinafter.

Under the condition that the above-mentioned control cable is closely contacted to the outer spring, if the control cable is heated, thermal expansion in the axial direction of the liner is restricted by the outer spring which has higher rigidity and lower coefficient of thermal expansion than the liner. Therefore, the liner cannot freely expand and release thermal stress thereof at high temperature. On the contrary, the liner can almost freely shrink when it is cooled. As a result of repeated rise and fall cycles of temperature, the liner shrinks successively and irreversibly in length.

In addition, when a liner is squeezed by the outer spring, the unevenness of the inside surface of the outer spring, especially at junctures of adjacent strips, comes out through the liner, therefore an operating feeling becomes worse, durability becomes lower, and so on.

Therefore, in order to reduce the above mentioned disadvantages, a clearance more than 0.5 mm between the control cable and the outer spring is required in a state that a liner is inserted into the outer spring. However, in this case, it is necessary to provide an additional mechanism so that the liner is not easy to slip out, for example, by making a flare portion at an end of the liner, or by putting a washer between the end of conduit and a member (e.g. cap member) to which the end of conduit is fixed.

On the other hand, with respect to the after-inserting type of conduit, even if there is a clearance between the liner and the outer spring, the liner cannot be easily inserted into the outer spring in case that a control cable is long.

The object of the present invention is to delete the above-mentioned disadvantages of the conventional control cable and to provide a control cable in which reversible thermal expansion and contraction of the liner is not hindered by the outer spring hence a liner is prevented from successive shrinking, the unevenness and roughness does not come out on the inside surface of the liner, and further, the liner is not easy to be slipped out of an outer spring without employing any special mechanism.

SUMMARY OF THE INVENTION

The control cable of the present invention comprises an inner cable, a conduit and a liner for slidably guiding the inner cable. The conduit has an outer spring made of a coiled steel strip and an outer coat made of synthetic resin formed on the outside surface of the outer spring. The liner is set between the above-mentioned conduit and the inner cable with remaining a clearance between the above-mentioned outer spring and the liner, and an interposition is provided in the clearance. The interposition is set in order to keep a suitable clearance and to provide a suitable resistance for a relative motion between the liner and the outer spring so that a thermal expansion and contraction of the liner is not hindered and nevertheless the liner cannot easily slip out of the outer spring.

In the control cable of the invention, since the clearance is provided between the outer spring and the liner, and further, the specified interposition is set in the clearance, thermal expansion of the liner is not hindered when the control cable is heated. Therefore, the liner is able to be prevented from successive and irreversible shrinking when the control cable is repeatedly heated and cooled.

In addition, since the control cable has the clearance between the outer spring and the liner, the unevenness of the outer spring does not come out on the inside surface of the liner, and the inside surface is kept smooth in any cable arrangement. Therefore, the operating feeling of the control cable becomes better as compared with a conventional control cable. Further, since the interposition is inserted in the clearance, the liner is not easy to be slipped out from the outer spring.

In the first aspect of the invention, a foamed material is used as the above-mentioned interposition. The foamed material provides an advantage, for example, that the heat expansion (or shrinkage) is absorbed due to the shrinkage (or expansion) of the formed material itself.

In the second aspect of the invention, a low melting- (or softening)-point material (hereinafter, referred to as "low melting-point material"), such as wax or resin used as the above-mentioned interposition. In the above-mentioned control cable, the low melting-point material is preferably laid intermittently on the liner. However, the material can be extended continuously along the liner.

Further, in the control cable, the melting point or the softening point is preferably in a range from 40° to 100° C.

When the low melting-point material is employed as the interposition, there is an advantage that the liner is not prevented from free thermal expansion since the low melting-point material is melted or softened at elevated temperature.

In the third aspect of the present invention, a string-like member is interposed between the outer spring and the liner as the interposition or a spacer.

In the above-mentioned control cable, at least one string-like member should be spirally wound around the liner or linearly extended along the liner. Further, in both cases, plural members can be used, and a combination of spirally wound member and a linearly extending member can be used. For example, a string-like member can be spirally wound around a liner with another linearly extending string-like member.

As the string-like member, a twisted thread, a continuous long untwisted bundle of multi-filaments or monofilament, or a tube can be employed.

In the control cable constructed as mentioned above, the string-like member is preferably a twisted thread impregnated with low melting-point material. In addition, a thread, filaments or a tube coated with the low melting-point material is also preferably employed as the string-like member.

When a string-like member is used as an interposition, a gap generates between the liner and the outer spring, and therefore, thermal expansion and contraction of the liner is not hindered due to the gap.

Hereinafter, referring to the accompanying drawings, some embodiments of the present invention will be explained.

DETAILED DESCRIPTION

Figure 1:
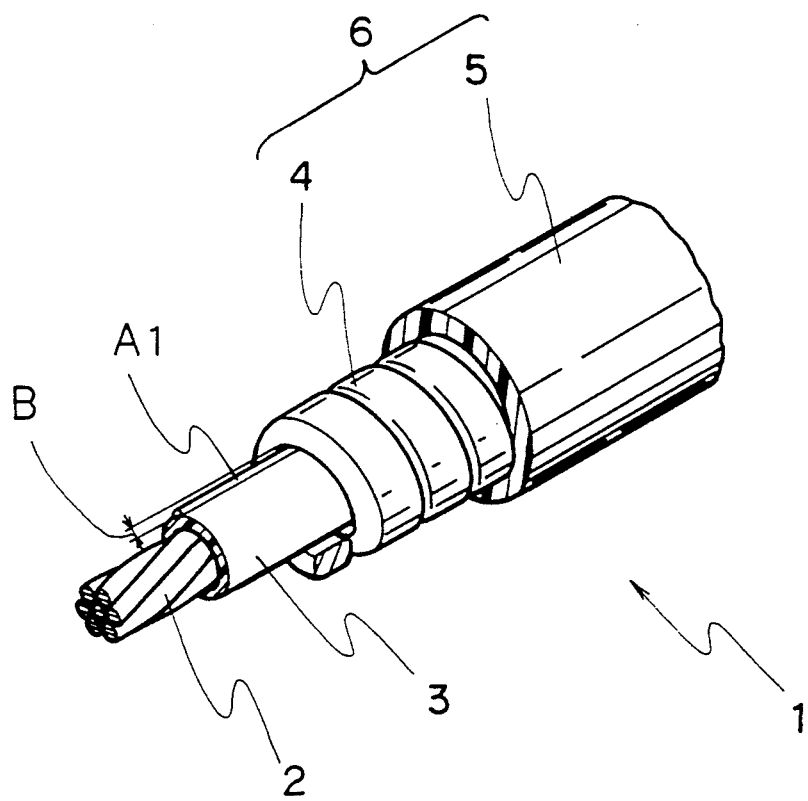
FIG. 1 and FIG. 2 are partially-cut-off perspective views showing embodiments of the control cable of the present invention.

The control cable of the present invention has, for example a construction shown in FIG. 1. However, the control cable of the present invention is not limited to the shape of FIG. 1.

The control cable 1 of FIG. 1 comprises a conduit 6. The conduit 6 comprises an outer spring 4 which is a steel wire roll-formed such that the cross section becomes flat, and then spirally wound, and an outer coat 5 made of synthetic resin. The coat 5 is formed around the outside surface of the outer spring.

The control cable 1 includes further a tubular liner 3 which is made of synthetic resin with small coefficient of friction and superior abrasion resistance. The liner 3 is provided in the outer spring of the above-mentioned conduit 6 with remaining a clearance B.

Further, an inner core or inner cable 2 is slidably inserted through the conduit 6, i.e. through the liner 3. The inner cable 2 is generally made of plural steel wires which are mutually twisted. A foamed material A1 is set in the clearance B between the above-mentioned outer spring 4 and the liner 3 as the interposition. In case of FIG. 1, the foamed material A1 is substantially straight and extends along the liner 3 in the axial direction. Besides, the linear foamed material A1 might be two or more.

The foamed material A1 is not only set straightly but also might be wound spirally around the liner 3.

Figure 2:
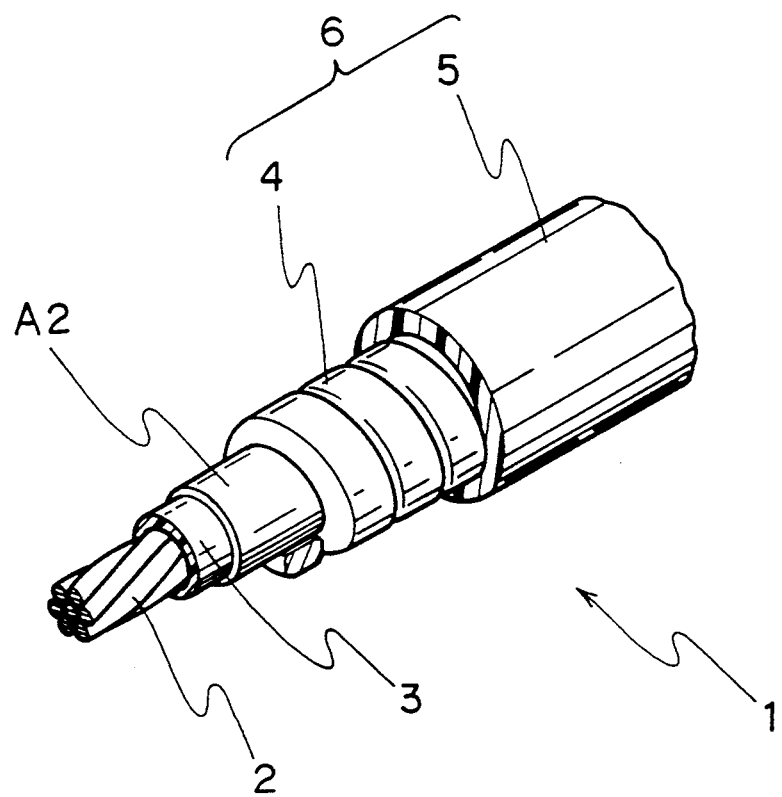

In the control cable shown in FIG. 2, the foamed material A2 has a tubular shape such that the liner 3 is covered with the foamed material A2.

In another case, the foamed material A2 might be also filled between the liner 3 and the outer spring 4.

Examples of the above-mentioned foamed material A1 are polyurethane, polyethylene, polypropylene, neopren, chloroprene, polystyrene, phenol, polyurea, polyvinyl chloride and the like.

The foamed material might be not only a open cell foam but also a closed cell foam. Expansion ratio of the foamed material is preferably 150–800% and more preferably 200–500%. As the material of the liner 3, tetrafluoroethylene/hexafluoropropylene copolymer polyacetal, and the like might be preferably employed. However, in the present invention, the material of the liner 3 is not limited to the above-mentioned polymer.

And the foamed material can be set between the outer spring and the liner continuously, intermittently on the liner 3. Further, a combination of continuously extending foamed material and intermittently extending foamed materials can also be used.

Figure 3:
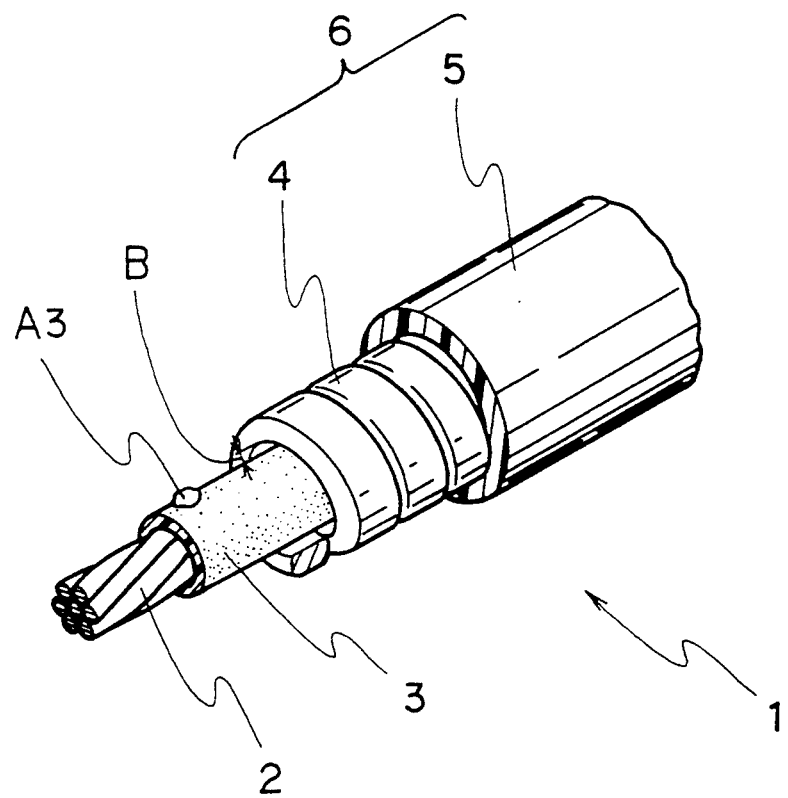
FIG. 3 and FIG. 4 are partially-cut-off perspective views of another embodiments of the control cable in a produced stage of the present invention.
Figure 4:
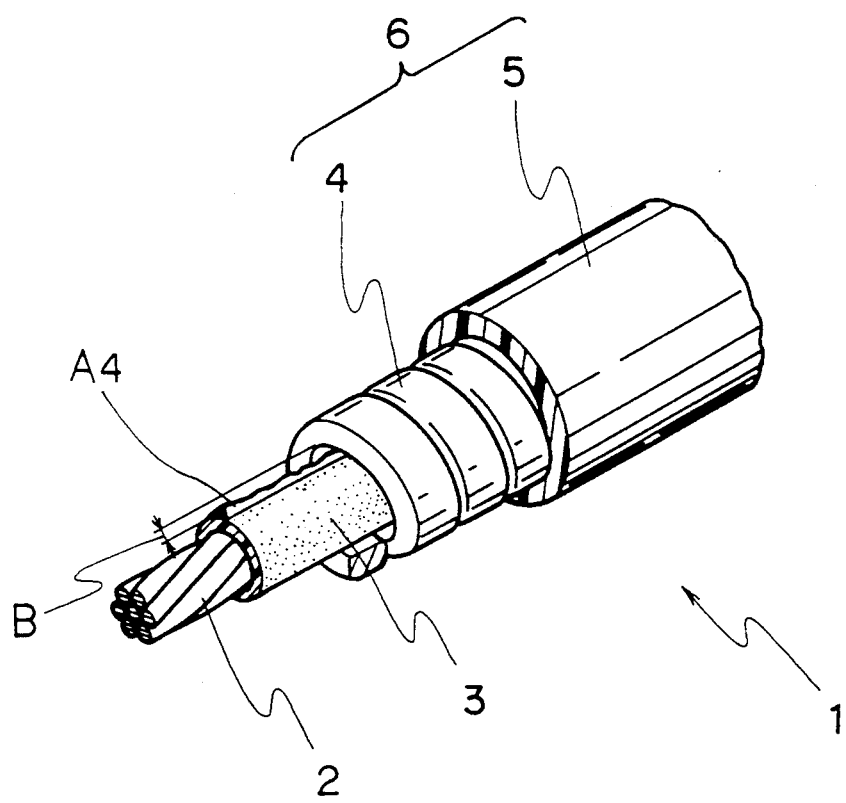

A control cable 1 shown in FIGS. 3 and 4 is the same as the control cable 1 shown in FIG. 1 except that low melting-point materials A3, A4 are set between the outer spring 4 and the liner 3.

As the above-mentioned low melting-point material, paraffin wax, saturated copolyesters, olefine copolymers (for example, ethylene-vinylacetate copolymer, ethylene-ethylacrylate copolymer), and hot melt adhesives (for example, plasticized compounds based on ethylene-vinylacetate copolymer, atactic polypropylene, copolyesters, synthetic rubbers) are mentioned. However, in the present invention, the material is not limited to the above-mentioned wax and resins, and another thermoplastic resins with low melting (or softening) point are able to be used.

The above-mentioned low melting-point material is set as an interposition intermittently (see FIG. 3) or continuously (see FIG. 4) provided material or a combination of intermittently provided material and continuously provided material, before the outer spring 4 is wound around the liner 4.

When the thickness of the above-mentioned material is not less than double of the clearance between the above-mentioned outer spring 4 and the liner 3, the material is melted or softened with heat, when the outer spring 4 is closely wound around the liner 3. Then, the resin advantageously is left as a film or a coat.

The preferable range of the melting point or the softening point of the material is 40° to 100° C. That is to say, in case that the melting point or softening point is more than 100° C., the material dropped on the liner 3 is not melted or softened with heat when the heated steel strip is closely coiled around the liner 3 to form an outer spring.

Therefore, the outer spring 4 is pushed on the liner 3, and the unevenness tends to come out on the inside face of the liner 3. On the contrary, if melting point or softening point is not larger than 40° C., the fixing force (adhesive force) between the low melting material and the liner 3 can be inferior.

The above-mentioned melting point is the temperature in which a solid becomes liquid by absorbing heat under a condition that a pressure is applied, and the above-mentioned softening point is the temperature in which a material becomes soft and a mechanical property (strength, or the like) of the material becomes low. The measuring methods for determining the melting point and the softening point are described hereinbelow.

The melting point can be determined, for example, in accordance with "method of measuring a transition point of a plastic in The Ameriacan Society for Testing and Materials (ASTM D 3418)". That is, at first a differential scanning calorimetry is performed, and melting temperature is found. Then the temperature is determined as the melting point of the material.

The softening point can be determined, for example, in accordance with ring and ball method (ASTM D 36-86, ASTM E28-67). That is to say, a melted sample is poured into a brass ring having a predetermined size, and then is cured. Next, a steel ball having a constant volume is put on the cured sample. Then, by heating the sample in a heated oil tank, the temperature when the ball drops through the sample is determined as the softening point.

Next, some embodiments of the control cable of the present invention in which a string-like member is used as an interposition will be explained with reference to FIGS. 5 to 7.

Figure 5:
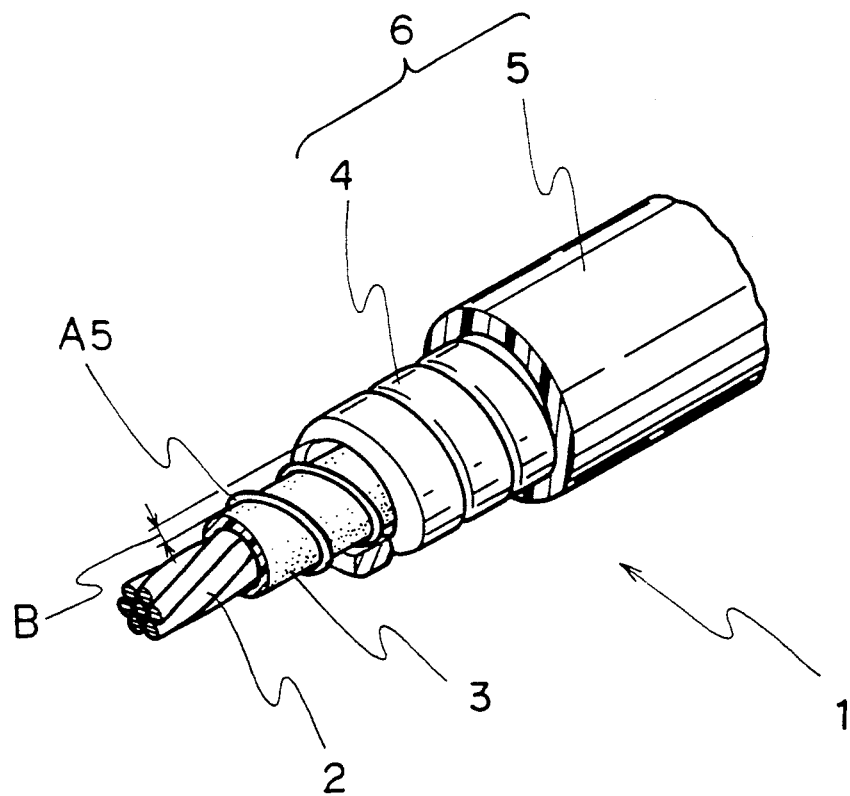
FIGS. 5 to 7 are partially-cut-off perspective views of further another embodiments of the control cable of the present invention.
Figure 6:
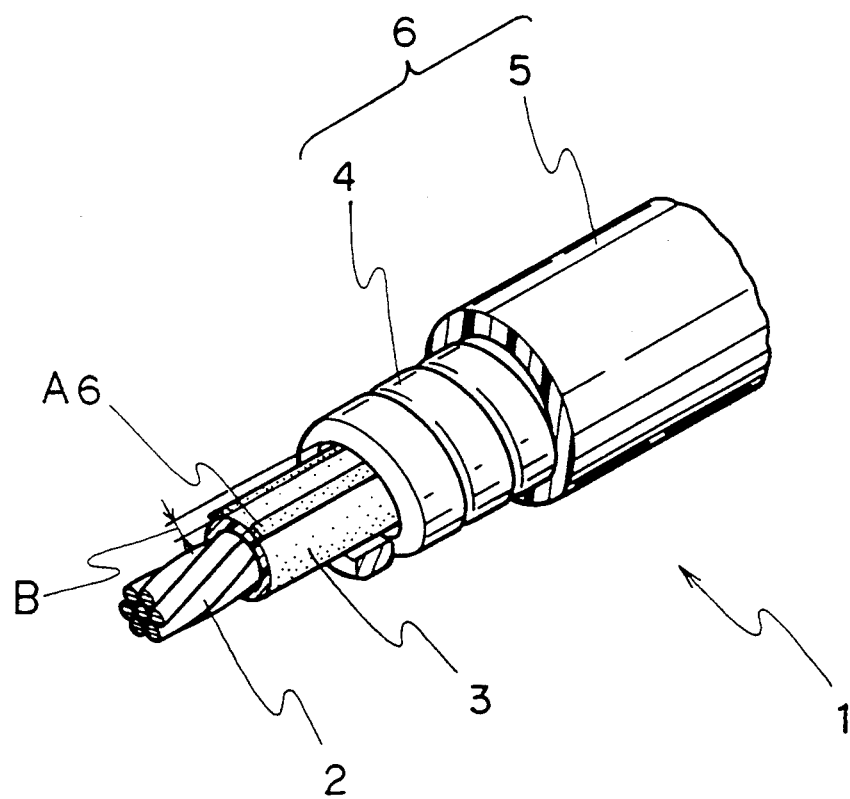
Figure 7:
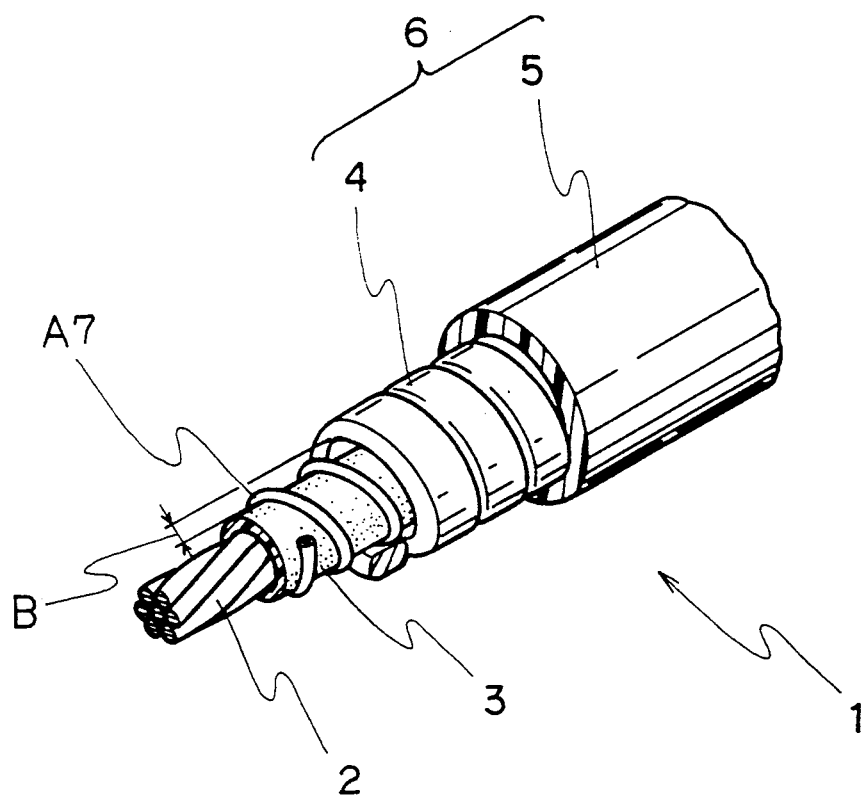

Conduits 6, inner cables 2 and liners 3 of the control cables 1 of FIGS. 5 to 7 are fundamentally the same as the control cables shown in FIGS. 1 and 2. Each of the string-like members A5, A6 and A7 is set between the above-mentioned outer spring 4 and the liner 3 as an interposition. The string-like member might be not only wound spirally on the outside surface of the liner 3 as shown in FIGS. 5 and 7, but also might be set rectilinearly along the liner 3 as shown in FIG. 6.

The above-mentioned string-like member is able to be formed spirally and linearly.

As the above-mentioned string-like member, a twisted thread or thread plying (A5 of FIG. 5), a bundle of filaments (A6 of FIG. 6), and a tube (A7 of FIG. 7) are mentioned. Examples of the material of the thread are, polyester, cotton yarn, and the like. Examples of the materials of the filament and the tube are a plastic (e.g. polyester, polyethylene, polyamide, polyacetal), thermoplastic elastomer (e.g. polyurethane, polyolefine elastomer, polyester elastomer, polyamide elastomer, polyvinylchroride elastomer, styrene elastomer, nitrile elastomer, chrorinated polyethylene) and a rubber material (ethylen-propylene rubber, butyl rubber, silicone rubber, urethane rubber, natural rubber).

The diameter of the above-mentioned string-like member is preferably 1.2 to 3 times of the dimension of the clearance B between an outer spring 4 and a liner 3. That is to say, when the diameter is less than 1.2 times of the clearance B, the liner 3 is respectively easily slipped out of the outer spring. On the contrary, when the diameter is more than three times of the clearance B, the unevenness tends to come out on the inside surface of the liner, since the liner 3 is abutted against the outer spring.

In case that the filaments A2 and the tube A3 are used, the diameter of the string-like member preferably has a diameter of 1 to 2 times of the clearance. When the diameter is less than the clearance B, the liner 3 tends to easily slip out of the outer spring 4, and when the diameter is more than the double clearance B, the unevenness tends to come out on the inside surface of the liner 3 since the liner 3 is compressed by the outer spring 4.

It is preferable that the inside diameter of the tube has a value not less than the remainder obtained by subtracting the clearance from the diameter. When the inside diameter is less than the remainder, the unevenness tends to come out on the inside surface of the liner since the tube A3 is lacking in the deformation quantity.

That is to say, even if the inside diameter of the tube is squeezed, the outer spring clamps the tube more than the squeezed dimension, since the thickness of tube is larger than the clearance.

The above-mentioned twisted thread A5, the filament A6 and the tube A7 are preferably impregnated or coated with low melting-point material. The low melting-point materials are selected from, for example, paraffin, saturated copolyester, ethylene-vinyl acetate copolymer and polyolefine resins.

The melting point and softening point of the low melting-point material are preferably 40° to 100° C. In case that the melting point or the softening point is more than 100° C., the material is not easily melted or softened with the heat of outer spring when the outer spring is wound around the liner. Therefore, the material is pressed on the liner, and the unevenness might come out on the inner surface of the liner. When melting point is less than 40° C., the fixing force of the material to the liner 4 is not sufficient, and the low melting-point material tends to easily come off from the liner. The preferable range of the above-mentioned melting point and softening point are the same as the above cases explained in relation to FIGS. 3 and 4.

Hereinafter, the control cable of the present invention and the technical effect are explained in detail with comparing some examples and comparative examples.

EXAMPLE 1

The control cable of Example 1 has a construction shown in FIG. 1, and is prepared as mentioned hereinafter.

An available high-carbon steel wire (Grade No. 1060 in ASTM A510) with 1.8 mm diameter, is roll-formed to obtain a flat steel strip with 1.00 mm (thickness)×2.45 mm (width).

A liner 3 was separately prepared by extruding a synthetic resin (tetrafuluoroethyrene/hexafuluoropropylene copolymer) to obtain a tubular shape having 3.00 mm in inside diameter and 3.80 mm in outside diameter.

Next, a string-like polyulethan foam A1 having a width of 1.0 mm and a thickness of 1.0 mm was provided on the liner 3 so as to extend along the liner 3.

Next, the above-mentioned steel strip was wound around the liner 3 with the foam A1 to form an outer spring 4 having outside diameter of 6.30 mm and inside diameter of 4.30 mm. Then, a clearance of 0.5 mm is remained between the outer spring 4 and the liner 3. That is to say, the polyulethan foam A1 is compressed by 0.5 mm.

At last, another synthetic resin (polypropylene resin) is provided on the outer spring to form a coat 5. Then, a conduit and a liner of Example 1 were obtained.

Figure 8:
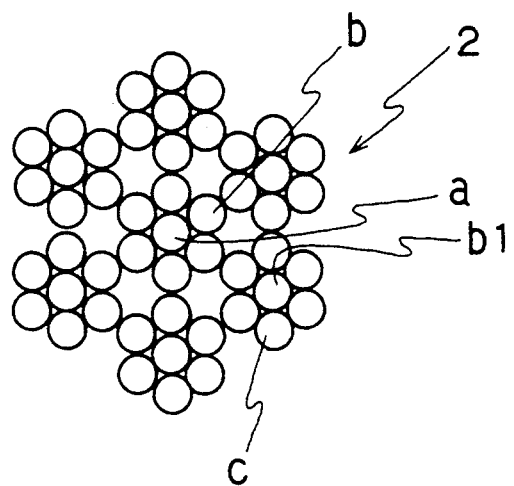
FIG. 8 is a cross sectional view of an embodiment of an inner cable in the present invention.

The inner cable 2 of the control cable of Example 1 has a cross section shown in FIG. 8 and was prepared as mentioned hereinafter.

At first, a steel wire (diameter 1.35 mm) galvanized with zinc was drawn to obtain a core wire (diameter: 0.35 mm) a of a core strand, a side wire (diameter: 0.30 mm) b of a core strand, a core wire b (diameter: 0.30 mm) of a side strand, and a side wire c (diameter 0.265 mm) of a side strand.

Then, a core wire a and six side wires b are twisted to obtain a core strand, and a core wire b1 and six side wires c are twisted to obtain a side strand. Next, one core strand and six side strands are twisted to obain an inner cable with 7×7 (see FIG. 8) construction and a total diameter of 2.50 mm.

EXAMPLE 2

A control cable 1 of Example 2 shown in FIG. 2 was prepared in the same process as Example 1 except that the liner 3 is fully coated with polyurethan foam A2 of which thickness is 0.5 mm. In this case, the polyurethan foam A2 is compressed to 0.25 mm in thickness.

COMPARATIVE EXAMPLE 1

In the control cable of Comparative Example 1, the polyurethan foam A1 of Example 1 was not interposed between the outer spring 4 and the liner 3. Further, an outer spring having outside diameter of 5.50 mm and the inside diameter of 3.50 mm and a liner 3 having outside diameter of 3.8 mm were used. Therefore, there was −0.3 mm clearance B between the outer spring and the liner, and the liner 3 is radially compressed with 0.3 mm. The remainder were the same as Example 1.

COMPARATIVE EXAMPLE 2

In the control cable of the comparative example 2, the above-mentioned foam materials A1 was not provided as an interposition between the outer spring 4 and the liner 3. The outside dimention of the liner 3 is 3.8 mm, and the outer spring 4 was wound such that the inside diameter is 3.90 mm and the outside diameter is 5.90 mm. Therefore, the clearance B between the outer spring 4 and the liner 3 was 0.1 mm.

The remainders were the same as Example 1.

EXAMPLE 3

As shown in FIG. 3, melted paraffin wax drops each having a diameter of 0.3 to 0.5 mm were intermittently dropped on the same liner 3 as Example 1 at intervals of 50 mm. Paraffin wax has melting point of 47° C.

Next, the steel strip was wound spirally such that the inside diameter was 3.90 mm and the outside diameter was 5.9 mm. The steel strip was the same as Example 1.

The clearance B is a gap between the liner 3 and the outer spring 4, when the liner 3 is shifted toward the one side as shown in FIG. 3, and was 0.10 mm.

EXAMPLE 4

Referring to FIG. 4, a control cable of Example 4 was prepared by the almost same process as Example 3. However, a saturated polyester resin of which melting point is 75° C. was used as a low melting material. Besides, the clearance B was 0.1 mm.

EXAMPLE 5

A control cable 1 of Example 5 was prepared by the same process as Example 3 except that ethylene-vinylacetate copolymer type of hot melt resin A3 was used as a low melting material, of which melting point was 80° C. was used and the resin was continuously dropped on the liner so that the height of drops was 0.2 to 0.5 mm.

EXAMPLE 6

A control cable 1 of Example 6 was prepared by the same process as example 3 except that polyester resin A4 of which melting point was 85° C. was used, and the resin was continuously dropped such that the height of drops was 0.2 to 0.5 mm as shown in FIG. 4.

COMPARATIVE EXAMPLE 3

A control cable 1 of the Comparative Example 3 was prepared by the same process as the Example 3 except that the low melting material was not interposed between the outer spring 4 and the liner 3, and the clearance between the outer spring 4 and the liner 3 was −0.1 mm.

In this case, the liner 3 was compressed for 0.1 mm, and the outer spring 4 was closely contacted with the liner 3.

COMPARATIVE EXAMPLE 4

A control cable 1 of the Comparative Example 4 is prepared by the same process as Example 3 except that no interposition was employed. In this case the clearance B was 0.1 mm.

EXAMPLE 7

A control cable 1 of Example 7 was prepared by the same process as Example 1 except the points mentioned hereinafter.

Referring to FIG. 5, a twisted thread A5, which was made of polyester and had a diameter of 0.15 mm, was wound spirally with spiral pitches of 50 mm on the same liner 3 as Example 1. The liner 3 had a diameter of 3.80 mm. Then, the same base wire as example 1 was wound such that the inside diameter was 3.90 mm and the outside diameter was 5.90 mm. In this case, the clearance B was 0.1 mm.

EXAMPLE 8

Referring to FIG. 6, a control cable 1 of Example 8 was prepareed by the same process as Example 7 except that a bundle of filaments A6 of polyamide was straightly arranged on the liner as a string-like member.

EXAMPLE 9

A control cable 1 of Example 9 was prepared by the same process as Example 7 except that a tube A3 was used as the string-like member. The meterial of the tube A3 was polyurethane, the outside diameter of the tube was 0.20 mm, and the inside diameter was 0.10 mm.

EXAMPLE 10

A control cable 1 of Example 10 was prepared by the same process as Example 7 except that a twisted thread A5 is straightly provided on the liner as a string-like member.

EXAMPLE 11

A control cable 1 of Example 11 was prepared by the same process as Example 7 except that the twisted thread A5 was previously impregnated with a saturated polyester resin, of which melting point is 75° C.

EXAMPLE 12

A control cable 1 of Example 12 was prepared by the same process as Example 8 except that the polyamide filaments A6 was coated with a saturated polyester resin.

EXAMPLE 13

A control cable 1 of Example 13 was prepared by the same process as Example 9 except that the tube A3 was coated with a saturated polyester resin of which melting point is 75° C.

Regarding the above-mentioned Examples 1 to 13 and Comparative Examples 1 to 4, the slipping-out-strength of the liner and the operating feeling were measured at room temperature as mentioned hereinafter.

Measuring method of slipping-out-strength and operating feeling

Figure 10:
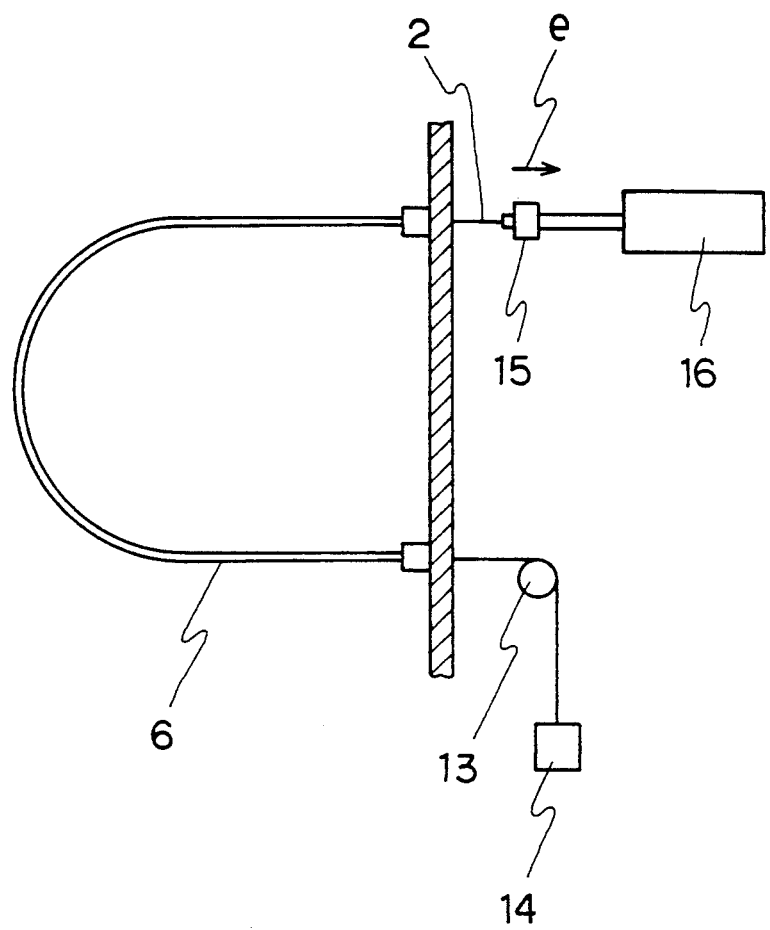
FIG. 10 is an illustrative view of an apparatus for measuring operating feeling of a control cable.

As shown in FIG. 10, conduits 6 of the above-mentioned Examples and Comparative Examples were cut so that each length of the conduits was 600 mm.

Next, a coat 5 which is the covering material was peeled off in a range from an end of the conduit over 50 mm length, and an outer spring 4 was cut so that only liner was exposed.

Figure 9:
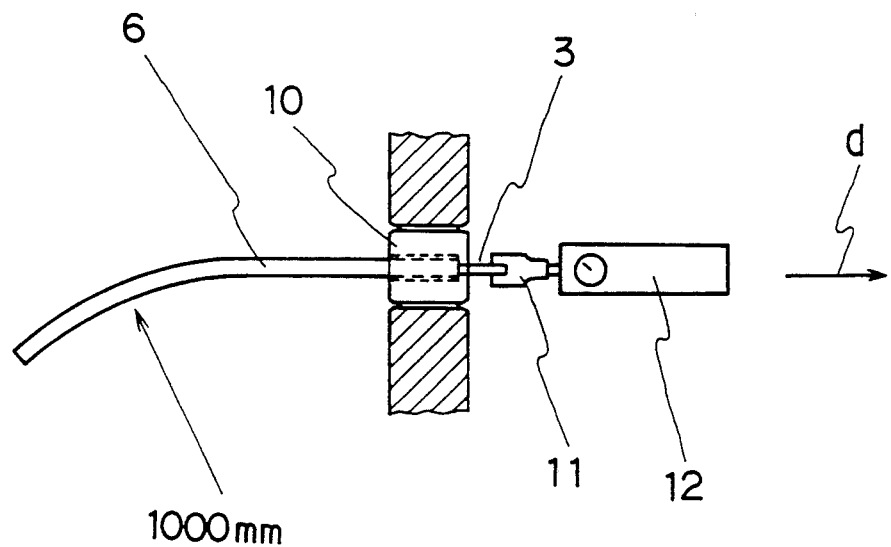
FIG. 9 is an illustrative view of an apparatus for measuring slipping-out-strength of a liner of a control cable.

Next, the end of the conduit 6 from which the liner 3 was projected was fixed by means of a jig 10 as shown in FIG. 9 such that the liner cannot move. Then, the top end of a liner 3 was fixed with a chuck 11, and was straightly pulled in the direction of an arrow d by a push-pull-scale 12. Then, the maximum tension strength was measured.

The conduit 6 was arranged with a easy curve having a bending radius of 1000 mm.

The measuring method of the characteristic of the operating feeling is shown in FIG. 10. The inner cable applied with silicone grease had a length of 1000 mm, and the inner cable 2 was inserted into the conduit 6 having a length of 700 mm. Thus obtained control cable 1 was arranged such that a control cable 1 was curved for 180° with a radius of 100 mm in U-like shape.

At the output end of the inner cable, a weight 14 of 5 kg is hung through a roller 13, and at the input end of the inner cable, a lineared motor 16 with a load cell 15, which was the load detector, was connected.

Figure 11:
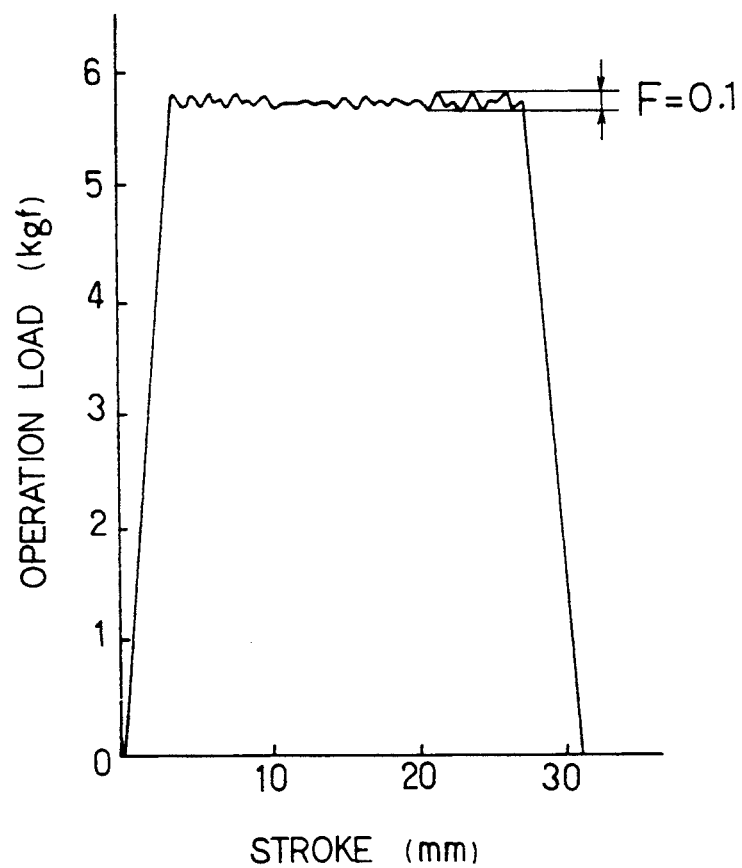
FIGS. 11, 12 and 13 are graphs showing characteristic of operating feeling of Examples of the control cable of the present invention.
Figure 12:
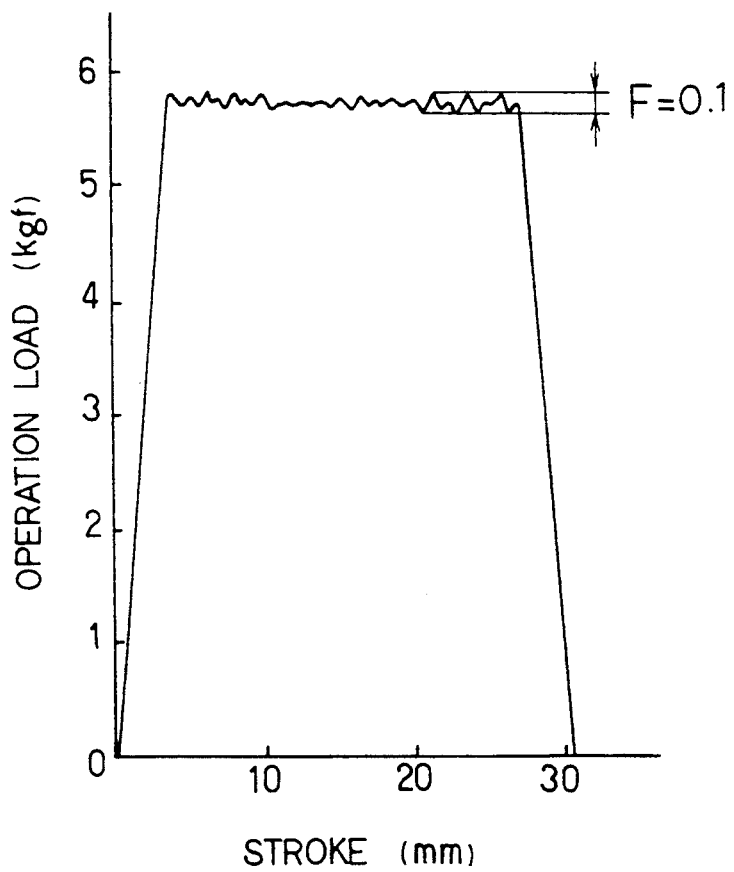
Figure 13:
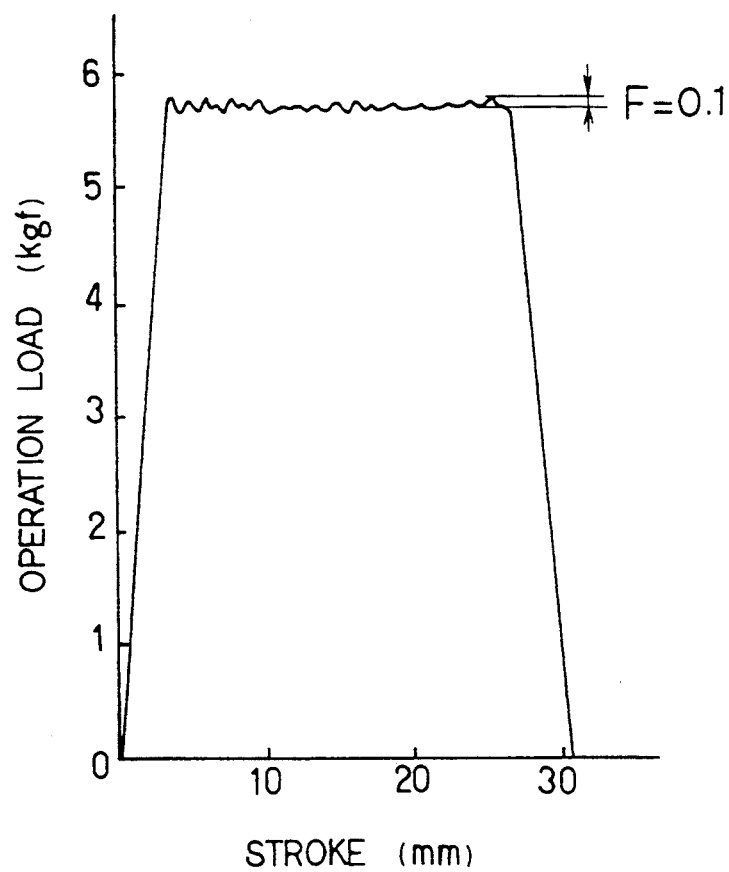
Figure 14:
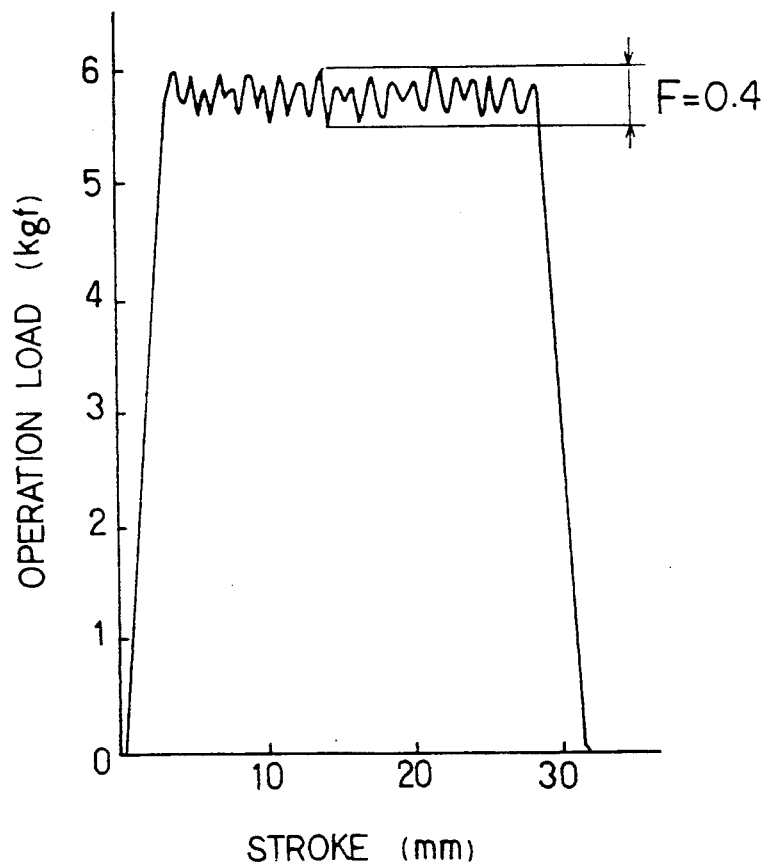
FIGS. 14 and 15 are graphs respectively showing characteristic of operating feeling of Comparative Examples.
Figure 15:
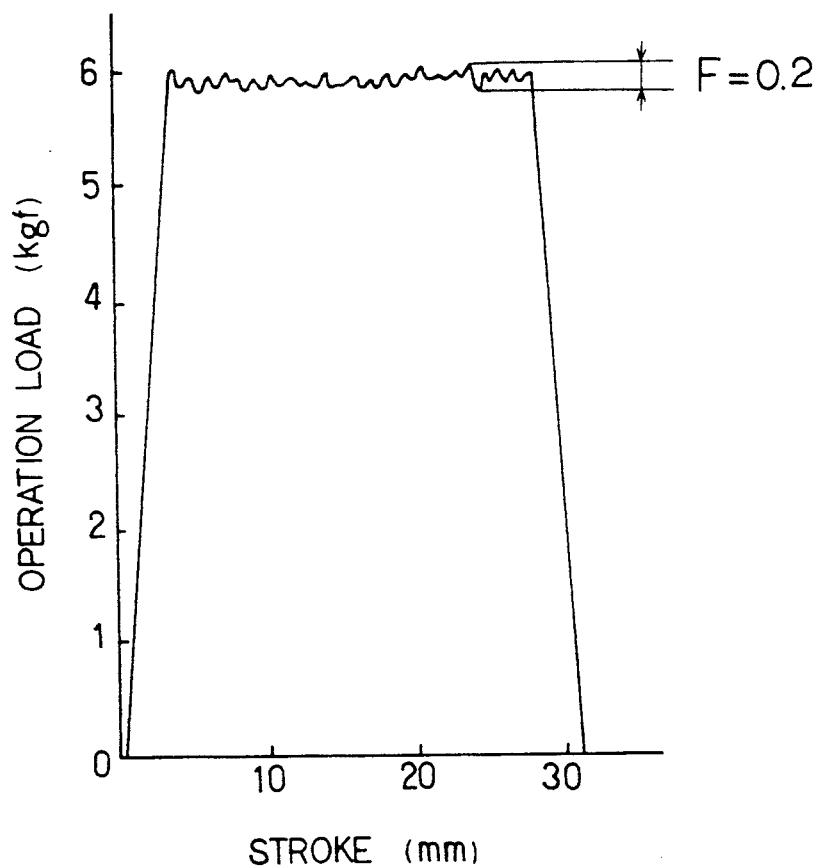
Figure 16:
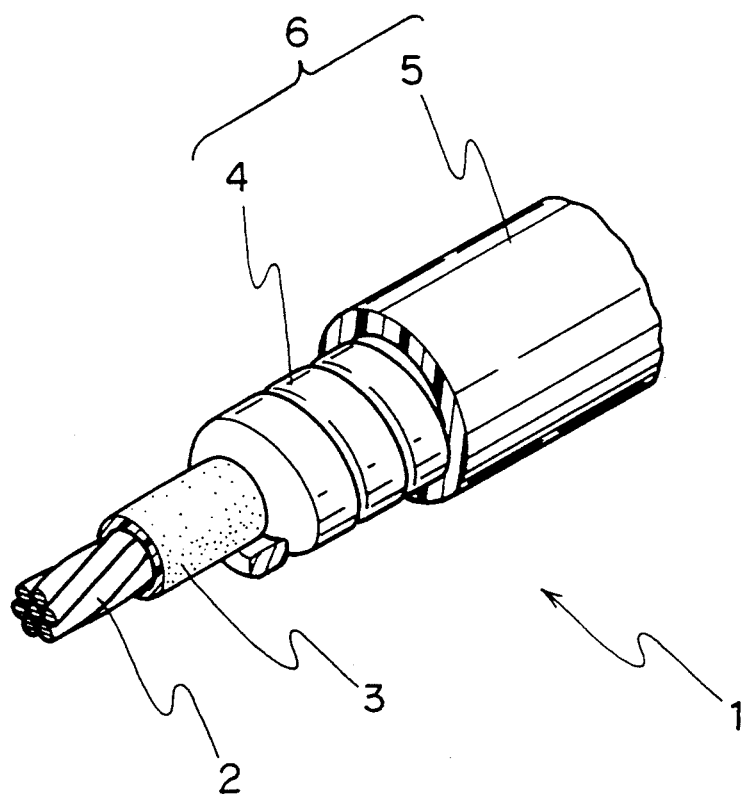
FIG. 16 is a partially-cut-off perspective view showing an example of conventional control cable.

The inner cable 2 was pulled in the direction of an arrow e by means of the lineared motor, such that the velocity was 5 mm/sec and the stroke was 30 mm. The sliding motion was repeated ten times, and thereafter, a real pull test was performed. The behavior of the slide motion was recorded on an X-Y recorder connected to a load cell 15 (not shown). In the present specification, the difference between the maximum operating force and the minimum operating force, during the pull motion of the inner cable is determined as a characteristic of the operating feeling value F. Some examples of the results drawn by X-Y recorder and the "F" are shown in FIGS. 11 to 13 and FIGS. 14 and 15. FIG. 11, FIG. 12 and FIG. 13 show the characteristic curves and the value F of the operating feeling of Example 1, Example 3 and Example 7, respectively. FIG. 14 and FIG. 15 show the curves and the value F of Comparative Example 1 and Comparative Example 3, respectively. The obtained results of the slipping-out-strength of the liner and the characteristic of the operating feeling of the control cables of the above-mentioned Examples 1 to 13 and Comparative Examples 1 to 4 are shown in Table 1.

TABLE 1

|  | Slipping-out-strength of liner (kgf) | Characteristic value of the operating feeling (kgf) |
| --- | --- | --- |
| Ex. 1 | 13 | 0.2 |
| Ex. 2 | 16 | 0.1 |
| Ex. 3 | 4.0 | 0.1 |
| Ex. 4 | 5.0 | 0.1 |
| Ex. 5 | 7.0 | 0.1 |
| Ex. 6 | 5.0 | 0.1 |
| Ex. 7 | 4.5 | 0.1 |
| Ex. 8 | 5.0 | 0.12 |
| Ex. 9 | 5.0 | 0.1 |
| Ex. 10 | 4.0 | 0.1 |
| Ex. 11 | 5.0 | 0.1 |
| Ex. 12 | 6.0 | 0.1 |
| Ex. 13 | 8.0 | 0.1 |
| Com. Ex. 1 | 10 | 0.4 |
| Com. Ex. 2 | 2.0 | 0.1 |
| Com. Ex. 3 | 5.0 | 0.2 |
| Com. Ex. 4 | 2.0 | 0.1 |

Generally, the slipping-out-strength should not be less than 2 kgf in order to securely fix the liner to the outer spring, when another thermoplastic resin is molded at the end face of a conduit for the secondary processing.

In accordance with the results shown in Table 1, the slipping-out-strength of the liner of Examples 1 and 2 having the above-mentioned foamed material as an interposition, are 13 and 16 kgf, respectively. However, the slipping out strength of the comparative Example 1 having the same clearance of −0.3 mm as Examples 1 and 2 is 10 kgf. Therefore, the strength of the Comparative Example 1 is inferior to that of Examples 1 and 2.

In relation to the characteristic of the operating feeling, Examples 1 and 2 are 0.1 and 0.2 kgf, respectively. However, Comparative Example 1 is 0.4 kgf. Therefore, the characteristic of the operating feeling of Comparative Example 1 is inferior to that of Examples 1 and 2. Further as is in Comparative Example 2, when the clearance B is made to 0.1 mm in order to make the characteristic of the operative feeling be 0.1 kgf, the slipping-out-strength of liner becomes merely 2 kgf.

Next, the slipping-out-strength of the liner of Examples 3 to 6 having an above-mentioned low melting material as an interposition, is 4.0 to 7.0 kgf. However, the slipping-out-strength of Comparative Example 4 having the same clearance as Example 4 has a strength of 2.0 kgf. That is to say, the strength of Comparative Example 4 is inferior to that of Examples 3 to 6.

In relation to the characteristic of the operating feeling, Examples 3 to 6 and Comparative Example 4 are 0.1 kgf, respectively. However Comparative Example 4 is 0.2 kgf. That is to say, the characteristic of the operating feeling is inferior to that of Example 3 to 6.

Those tendency can be understood from the results that the characteristic of the operating feeling, which was 0.25 kgf, is inferior to Examples.

Further, the slipping-out-strength of the liner of Examples 7 to 13 having the above-mentioned string-like member as an interposition, is in the range of 4.0 to 8.0 kgf. However, the slipping-out-strength of Comparative Example 4 having the same clearance of 0.1 mm as Example 7 to 13 was merely 2.0 kgf. That is to say, the strength of Comparative Example 4 is inferior to that of Examples 7 to 13.

In relation to the characteristic of the operating feeling, Examples 7 to 13 are 0.1 to 0.12 kgf. However, in the Comparative Example 4, the feeling is 0.1 kgf. Therefore, it can be understood that the characteristic of the operating feeling of Comparative Example 4 is nearly equal to that of Example 7 to 13.

As discussed above, in the control cable of the present invention, the characteristic of operating feeling is good and the slipping-out-strength can be sufficiently retained, and it can be understood that those effect obtained since in the control cables of Example 1 to 13, the interpositions are interposed between the outer spring 4 and the liner 3, the liner is not hindered from thermal expansion by the outer spring when the control cable is heated, and therefore, the liner is prevented from shrinking when the control cable is cooled, and further since the roughness and the unevenness do not come out on the liner 4 in Examples.

The control cable of the present invention is able to be prevented from shrink of a liner when the control cable is cooled, since the thermal expansion of a liner is not hindered by an outer spring when the control cable is heated. In addition, the operating feeling of the control cable of the present invention is good in comparison with conventional control cables.

And besides, the slipping-out-strength from an outer spring of a liner can be retained without providing any additional mechanism.

Though several embodiments of the invention are described above in detail, it is to be understood that the present invention is not limited to the above-mentioned embodiment, and various changes and modifications may be made in the invention without departing from the spirit and scope thereof.

What is claimed is:

1. A control cable comprising:
(a) an inner cable;
(b) a conduit slidably guiding the inner cable;
(c) a tubular liner provided in the conduit; and
(d) an interposition being of a low melting-point plastic material having a melting point in a range from 40° to 100° C.; said conduit (b) comprising:
(b-1) an outer spring made by winding a steel strip around the liner with remaining a clearance between the outer spring and the liner; and
(b-2) a coat made of synthetic resin formed on the outer spring; and
said interposition (d) being set between said outer spring and said liner in order to keep said clearance and to provide a suitable resistance to a relative motion between the liner and the outer spring so that thermal expansion and contraction of the liner is not hindered and nevertheless the liner cannot easily slip out of the outer spring.

2. The control of cable of claim 1 wherein said interposition is made of a foamed material.

3. The control cable of claim 2 wherein said foamed material is substantially straight strip and extends along the liner in an axial direction.

4. The control cable of claim 2 wherein said liner is coated with the foamed material.

5. The control cable of claim 1 wherein said low melting-point material is laid intermittently in an axial direction on the liner.

6. The control cable of claim 1, wherein said interposition is a string-like member which is provided along the liner.

7. The control cable of claim 6, wherein said string-like member is spirally wound around the liner.

8. The control cable of claim 6, wherein said string-like member straightly extends along the liner.

9. The control cable of claim 6, wherein said string-like member is a twisted thread.

10. The control cable of claim 6, wherein said string-like member is a continuous long untwisted bundle of filaments.

11. The control cable of claim 6, wherein said string-like member is a mono-filament.

12. The control cable of claim 6, wherein said string-like member is a tube.

13. The control cable of claim 12, wherein melting or softening point of the low melting-point material is in a range from 40° to 100° C.

14. The control cable of claim 6, wherein said string-like member is impregnated with low melting-point material.

15. The control cable of claim 6, wherein said string-like member is coated with low melting-point material.

16. The control cable of claim 15, wherein melting or softening point of the low melting-point material is in a range from 40° to 100° C.

17. A control cable as recited in claim 1, wherein said low melting-point material of said interposition is not bent radially.

18. A control cable as recited in claim 1, wherein said melting point of said interposition is lower than a melting point of said tubular liner.

19. A control cable comprising:
(a) an inner cable;
(b) a conduit slidably guiding the inner cable;
(c) a tubular liner provided in the conduit; and
(d) an interposition being of a low melting-point material having a melting point in a range from 40° to 100° C. wherein said low melting-point material is a substantially straight strip and extends along the liner continuously in an axial direction; said conduit (b) comprising:
(b-1) an outer spring made by winding a steel strip around the liner with remaining a clearance between the outer spring and the liner; and
(b-2) a coat made of synthetic resin formed on the outer spring; and
said interposition (d) being set between said outer spring and said liner in order to keep said clearance and to provide a suitable resistance to a relative motion between the liner and the outer spring so that thermal expansion and contraction of the liner is not hindered and nevertheless the liner cannot easily slip out of the outer spring.

* * * * *